(12) United States Patent
Aoki

(10) Patent No.: US 10,002,441 B2
(45) Date of Patent: Jun. 19, 2018

(54) IMAGE PROCESSING APPARATUS, IMAGE PROCESSING METHOD, AND COMPUTER-READABLE RECORDING MEDIUM

(71) Applicant: FUJITSU LIMITED, Kawasaki-shi, Kanagawa (JP)

(72) Inventor: Takahiro Aoki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days. days.

(21) Appl. No.: 15/334,372

(22) Filed: Oct. 26, 2016

(65) Prior Publication Data

US 2017/0132805 A1 May 11, 2017

(30) Foreign Application Priority Data

Nov. 10, 2015 (JP) ................................ 2015-220640

(51) Int. Cl.
| | |
|---|---|
| *G06K 9/00* | (2006.01) |
| *G06T 7/60* | (2017.01) |
| *G06K 9/32* | (2006.01) |
| *G06K 9/52* | (2006.01) |
| *G06T 17/30* | (2006.01) |

(52) U.S. Cl.
CPC ............ *G06T 7/60* (2013.01); *G06K 9/00912* (2013.01); *G06K 9/3275* (2013.01); *G06K 9/52* (2013.01); *G06T 17/30* (2013.01); *G06K 9/00013* (2013.01); *G06K 2009/00932* (2013.01); *G06T 2207/10004* (2013.01)

(58) Field of Classification Search
CPC ........ G06T 7/60; G06K 9/00013; G06K 9/00; G07C 9/00158; G07C 9/00087; G06F 21/0052
See application file for complete search history.

(56) References Cited

U.S. PATENT DOCUMENTS 7,596,323 B1\* 9/2009 Price .................. H04B 10/0775
398/140
2006/0072158 A1\* 4/2006 Christie ............. H04N 1/40012
358/3.01
(Continued)

FOREIGN PATENT DOCUMENTS

| JP | 2007-233981 | 9/2007 |
| JP | 2009-238205 | 10/2009 |

OTHER PUBLICATIONS

Extended European Search Report dated Mar. 23, 2017 for corresponding European Patent Application No. 16195954.9, 8 pages.
(Continued)

*Primary Examiner* — Amir Alavi
(74) *Attorney, Agent, or Firm* — Fujitsu Patent Center

(57) ABSTRACT

An image processing apparatus includes an imaging unit that divides an image of a subject into blocks, a quadric-surface fitting unit that calculates a distance from a reference position to the subject that corresponds to each block, a weight calculating unit that calculates a weight of each block according to the distance, and a barycenter calculating unit that corrects information about a size of the subject projected in each block based on the weight, and calculates barycentric coordinates based on the corrected information about the size of the subject.

8 Claims, 10 Drawing Sheets

(56) References Cited

U.S. PATENT DOCUMENTS

| | | | | |
|---|---|---|---|---|
| 2008/0144946 A1* | 6/2008 | Naccari | ............... | G06K 9/38 |
| | | | | 382/225 |
| 2010/0118053 A1* | 5/2010 | Karp | ............... | G01C 11/06 |
| | | | | 345/630 |
| 2011/0001814 A1 | 1/2011 | Yamanaka et al. | | |
| 2017/0132459 A1* | 5/2017 | Sunkavalli | ......... | G06K 9/00288 |
| 2017/0132805 A1* | 5/2017 | Aoki | ............... | G06T 7/60 |

OTHER PUBLICATIONS

Grange, Sebastien et al., "Robust Real-time 3D Detection of Obstructed Head and Hands in Indoors Environments", Journal of Multimedia, Academy Publisher, Finland, vol. 1, No. 4, Jul. 1, 2006, pp. 29-36, XP002639938.

Siyang, Gu et al., "3D Object Recognition Using Qualitative Features", 1994 International Symposium on Speech, Image Processing and Neural Networks, Proceedings, Apr. 13, 1994, Hong Kong, New York, NY, USA, IEEE, pp. 205-208, XP010121524.

Fan, Ting-Jun et al., "Recognizing 3-D Objects Using Surface Descriptions", IEEE Transactions on Pattern Analysis and Machine Intelligence, IEEE Computer Society, USA, vol. 11, No. 11, Nov. 1, 1989, pp. 1140-1157, XP000081261.

* cited by examiner

IMAGE PROCESSING APPARATUS, IMAGE PROCESSING METHOD, AND COMPUTER-READABLE RECORDING MEDIUM

CROSS-REFERENCE TO RELATED APPLICATION(S)

This application is based upon and claims the benefit of priority of the prior Japanese Patent Application No. 2015-220640, filed on Nov. 10, 2015, the entire contents of which are incorporated herein by reference.

FIELD

The embodiments discussed herein are related to an image processing apparatus, and the like.

BACKGROUND

In image processing, statistical calculation, such as average value calculation, is applied in some cases to a subject region when the barycenter of the subject is calculated. For example, in palm vein authentication, image processing apparatuses that execute palm vein authentication calculate a mean average value of coordinates of each point in a palm of a hand being a subject, to identify the barycenter (Japanese Laid-open Patent Publication Nos. 2009-238205 and 2007-233981).

However, there has been a problem that it is difficult to achieve statistical calculation for a subject region accurately when the subject of image processing is inclined. For example, taking the palm vein authentication as an example, the problem that it is difficult to achieve statistical calculation accurately when an image of a subject region to be an authentication feature is processed is explained.

FIG. 11 explains influence caused when a subject is inclined. As depicted in FIG. 11, a camera projects a subject on an imaging device. When the subject is inclined, imaged areas of the subject to be projected in one pixel of the imaging device are not uniform. That is, a region B of the subject projected in a pixel $P_B$ has a larger image area than a region A of the subject projected in a pixel $P_A$. In other words, in the pixel $P_B$, the region B that is longer than the region A is projected. The data amount of the pixel $P_B$ is underestimated compared to the data amount of the pixel $P_A$.

In such a case, for example, the image processing apparatus calculates barycentric coordinates $X_G$ by using following Equation (1). N refers to the total number of pixels, and $x_i$ refers to coordinates of i-th pixel. That is, in barycenter calculation, all pixels are calculated with the uniform weight of 1.0.

$$X_G = \sum_{i=1}^{N} x_i / N \quad (1)$$

This results in underestimation of the data amount of the region B compared to the data amount of the region A. Inversely, the data amount of the region A is overestimated compared to the data amount of the region A. As a result, the barycentric coordinates $X_G$ are drawn toward the direction of the region A, to be miscalculated.

The above problem is not limited only to the case of the subject being inclined, but also applies to the case of the subject being bent.

SUMMARY

According to an aspect of an embodiment, an image processing apparatus includes a processor that executes a process. The process includes dividing an image of a subject into a plurality of blocks. The process includes measuring a distance from a reference position to the subject corresponding to each of the blocks. The process includes setting a weight of each of the blocks according to the distance. The process includes correcting information about a size of the subject that is projected in each of the blocks based on the weight. The process includes calculating a statistical amount of the subject based on the corrected information about the size of the subject.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT(S)

Preferred embodiments of the present invention will be explained with reference to accompanying drawings. The present invention is not limited to the embodiments.

[a] First Embodiment

Figure 1:
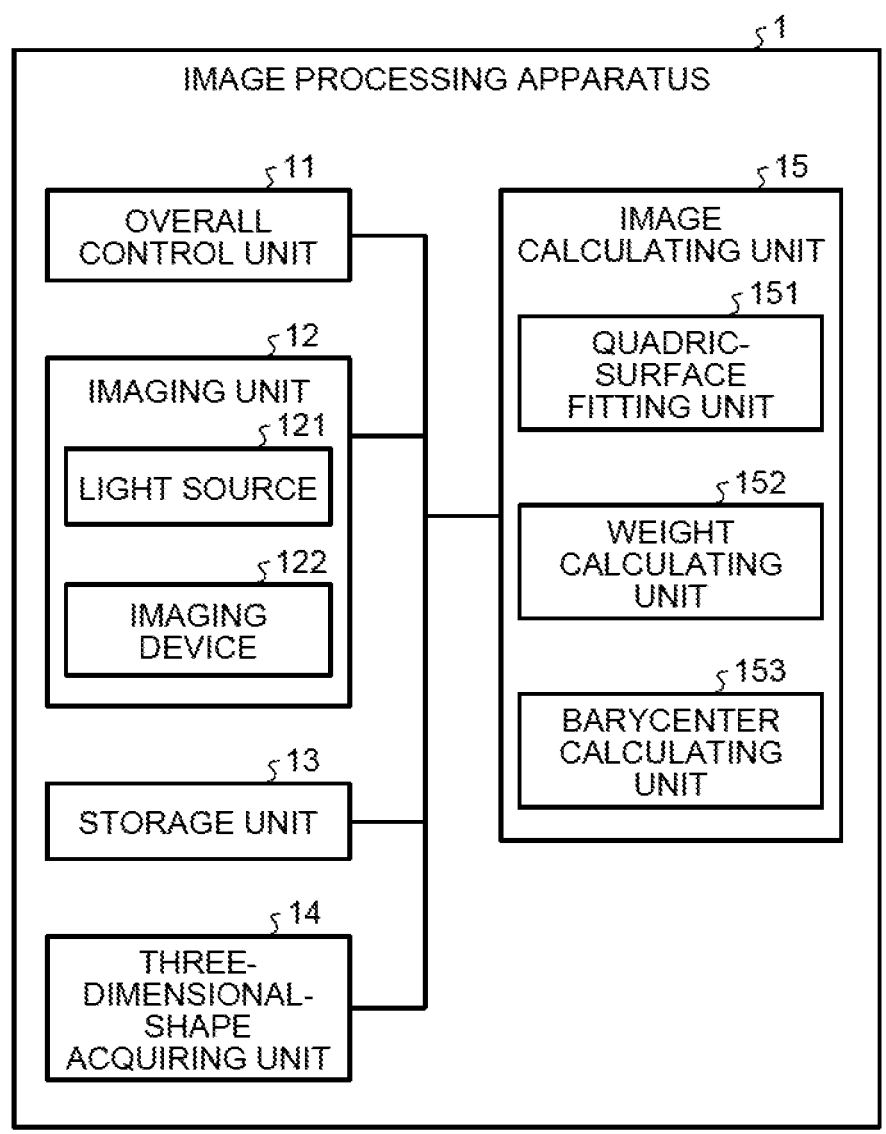
FIG. 1 is a functional block diagram depicting a configuration of an image processing apparatus according to a first embodiment.

FIG. 1 is a functional block diagram depicting a configuration of an image processing apparatus according to a first embodiment. An image processing apparatus 1 depicted in FIG. 1 is designed to improve the accuracy in calculation of a barycenter by applying weighting processing based on an amount of information projected per unit (for example, pixel) of image processing when a barycenter is calculated from an image obtained by imaging a subject.

The image processing apparatus 1 includes an overall control unit 11, an imaging unit 12, a storage unit 13, a three-dimensional-shape acquiring unit 14, and an image calculating unit 15.

The overall control unit 11 controls the entire image processing apparatus 1.

The imaging unit 12 performs imaging processing for acquiring an image of a subject. The imaging unit 12 includes a light source 121 and an imaging device 122. The light source 121 emits light, and as a result, the emitted light hit the subject. The imaging device 122 is a device that accumulates light entering through a lens as an electric signal, and is expressed by pixels. That is, the imaging device 122 divides an image of the subject into pixels. The imaging unit 12 is, for example, a camera. The imaging device 122 is, for example, a charge-coupled device (CCD), or a complementary metal oxide semiconductor (CMOS) device.

The storage unit 13 is, for example a semiconductor memory device such as a random access memory (RAM), a flash memory, or a storage device such as a hard disk and an optical disk. The storage unit 13 stores, for example, image data.

The three-dimensional-shape acquiring unit 14 acquires three-dimensional shape data of the subject. For example, the three-dimensional-shape acquiring unit 14 acquires shape from shading (SFS) data, which is three-dimensional shape data) by applying an SFS technique. The SFS technique is a technique of estimating a three-dimensional shape of an object from brightness values of an image obtained by applying light to the subject. The estimated three-dimensional shape data is called SFS data. As one example, in a palm vein sensor, the SFS technique is applied to reflection light of near infrared rays. Although it has been explained that the three-dimensional-shape acquiring unit 14 acquires three-dimensional shape data by applying the SFS technique, not limited to the SFS technique, and other techniques may be applied as long as three-dimensional shape data can be acquired.

The image calculating unit 15 performs calculation processing by using the three-dimensional shape data acquired by the three-dimensional-shape acquiring unit 14. The image calculating unit 15 includes a quadric-surface fitting unit 151, a weight calculating unit 152, and a barycenter calculating unit 153.

The quadric-surface fitting unit 151 fits the three-dimensional shape data of the subject into quadric surface. For example, the quadric-surface fitting unit 151 acquires height of the subject from the three-dimensional shape data that is acquired by the three-dimensional-shape acquiring unit 14. The quadric-surface fitting unit 151 then fits the subject into a quadric surface based on the height of the subject.

The weight calculating unit 152 calculates an area on the subject corresponding to one pixel on the image, by using the three-dimensional shape data of the subject, and calculates a weight according to the calculated area. The weight calculating unit 152 calculates a weight according to an area by using Equation (2) below. N refers to the total number of pixels, $S_i$ refers to an area on the subject that corresponds to i-th pixel. $s_i$ refers to a weight according to an area on the subject that corresponds to the i-th pixel, and is a value obtained by normalizing $S_i$.

$$s_i = \frac{S_i}{\sum_{i=1}^{N} S_i} \quad (2)$$

The barycenter calculating unit 153 calculates barycentric coordinates of the subject by using the weight according to an area on the subject. The barycenter calculating unit 153 calculates barycentric coordinates $X_G$ by using Equation (3) below. That is, the barycenter calculating unit 153 corrects information relating to the size of the subject that is projected in each pixel based on the weight. N refers to the total number of pixels, $x_i$ refers to coordinates of the i-th pixel. $s_i$ refers to a weight according to an area on the subject that corresponds to the i-th pixel, and is a value acquired by Equation (2).

$$X_G = \sum_{i=1}^{N} s_i x_i \quad (3)$$

The calculation method of barycentric coordinates thus using weights according to an area on a subject is referred to as a first calculation method of barycentric coordinates for convenience of explanation.

Figure 2:
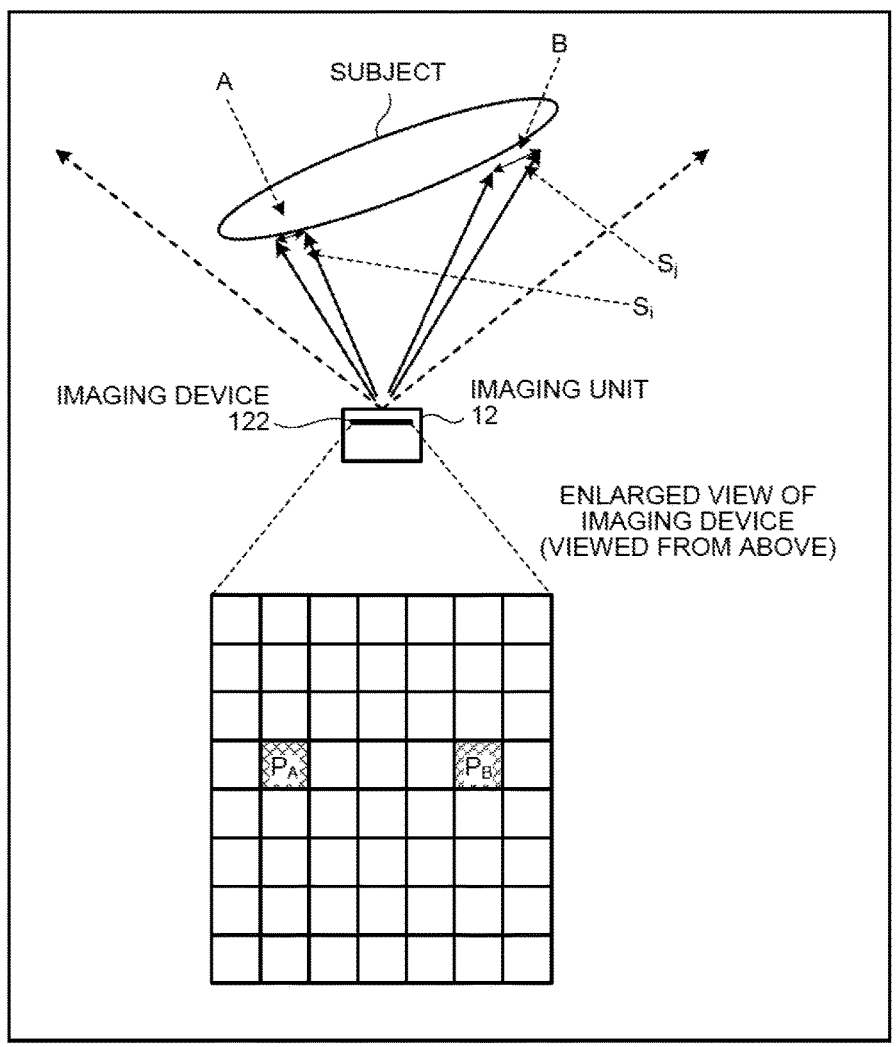
FIG. 2 explains first calculation processing of barycentric coordinates according to the first embodiment.

First calculation processing of the barycentric coordinates according to the first embodiment is explained referring to FIG. 2. FIG. 2 explains the first calculation processing of barycentric coordinates according to the first embodiment. As depicted in FIG. 2, when the subject is inclined, imaged areas of the subject to be projected in one pixel are not uniform. That is, a region B of the subject projected in a pixel $P_B$ has a larger area than a region A of the subject projected in a pixel $P_A$. That is, in the pixel $P_B$, the region B that is longer than the region A is projected. In other words, the data amount of the pixel $P_B$ is underestimated compared to the pixel $P_A$.

The weight calculating unit 152 calculates an area on the subject that corresponds to one pixel on the image by using the three-dimensional shape data of the subject. In this example, the area on the subject that corresponds to the pixel $P_A$ is $S_i$. The area that corresponds to the pixel $P_B$ is $S_j$. $S_i$ is smaller than $S_j$. The weight calculating unit 152 calculates a weight according to the region by using Equation (2). In this example, the weight obtained by normalizing $S_i$ is $s_i$.

Subsequently, the barycenter calculating unit 153 calculates barycentric coordinates of the subject by using a value obtained by multiplying coordinates of a pixel by the weight according to the area on the subject that corresponds to the pixel. This is to calculate the barycentric coordinates of the subject after the data amount of the pixel $P_B$ that corresponds to the area $S_j$ of the region B is equalized to the data amount of the pixel $P_A$ that corresponds to the area $S_i$ of the region A. Thus, the barycenter calculating unit 153 is enabled to calculate the barycentric coordinates corresponding to a subject region accurately.

Referring back to FIG. 1, although it has been explained that the weight calculating unit 152 calculates a weight according to an imaged area of the subject projected in one pixel, it is not limited thereto. The weight calculating unit 152 may calculate a weight according to a distance to the subject projected in one pixel from a reference position and inclination. That is, the weight calculating unit 152 calculates a distance to the subject corresponding to each pixel from the reference position and inclination based on the three-dimensional shape data of the subject. The weight calculating unit 152 calculates a weight according to the distance and the inclination by using Equation (4) and Equation (5) below. The reference position is, for example, a position of the lens included in the imaging unit 12, but not limited thereto. N refers to the total number of pixels, and $Z_i$ refers to a height of a point on the subject that corresponds to the i-th pixel. $n_i$ refers to a unit normal vector at a point on the subject that corresponds to the i-th pixel. $e_z$ refers to a unit normal vector in a Z-axis direction. $W_i$ refers to a value that is determined by a height and inclination of a point on the subject that corresponds to the i-th pixel. $w_i$ refers to a weight according to a height and inclination on the subject that corresponds to the i-th pixel, and is a value obtained by normalizing $W_i$.

$$Wi = \frac{Z_i}{n_i \cdot e_z} \quad (4)$$

$$wi = \frac{W_i}{\sum_{i=1}^{N} W_i} \quad (5)$$

When a weight according to a distance and inclination is calculated by the weight calculating unit 152, the barycenter calculating unit 153 calculates barycentric coordinates of the subject according to the weight according to the distance and inclination. The barycenter calculating unit 153 calculates the barycentric coordinates $X_G$ by using following Equation (6). That is, the weight calculating unit 152 corrects information relating to a size of the subject that is projected in each pixel based on the weight. N refers to the total number of pixels, and $x_i$ refers to coordinates of the i-th pixel. $w_i$ refers to a weight according to a height and inclination on the subject that corresponds to the i-th pixel, and is a value acquired by Equation (5).

$$X_G = \sum_{i=1}^{N} w_i x_i \quad (6)$$

The calculation method of barycentric coordinates thus using a weight according to a distance is referred to as a second calculation method of barycentric coordinates for convenience of explanation.

Figure 3:
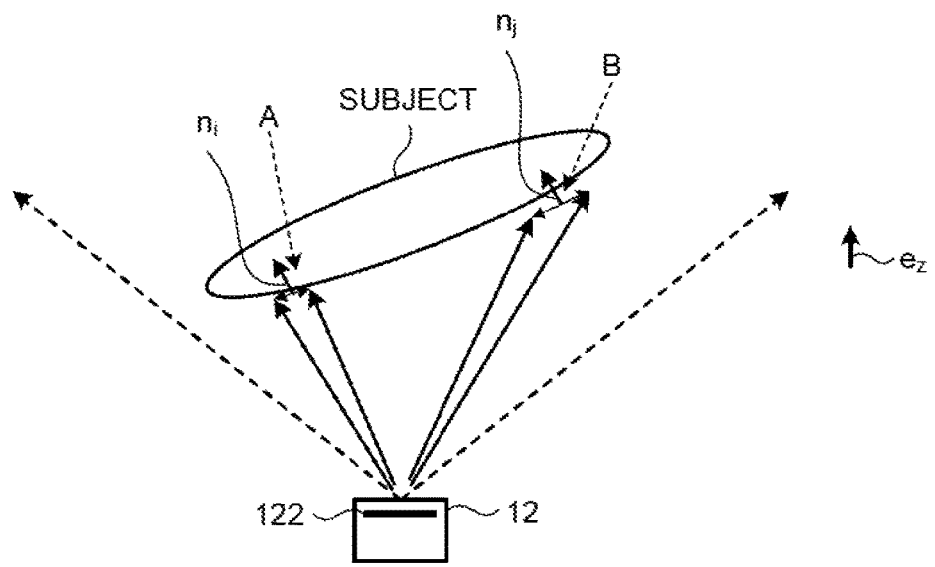
FIG. 3 explains second calculation processing of barycentric coordinates according to the first embodiment.

A second calculation processing of barycentric coordinates according to the first embodiment is explained referring to FIG. 3. FIG. 3 explains the second calculation processing of barycentric coordinates according to the first embodiment. As depicted in FIG. 3, when the subject is inclined, heights from the reference position (for example, the lens) to the subject projected in one pixel are not uniform. Therefore, an imaged area to be projected in a pixel increases as the region increases in height. In this example, the region B of the subject is positioned higher than the region A of the subject, and the region B of the subject projected in the pixel $P_B$ has a larger image area than the region A of the subject projected in the pixel $P_A$. That is, in the pixel $P_B$, the region B that is longer than the region A is projected. In other words, the data amount of the region B included in the pixel $P_B$ is underestimated compared to the data amount of the region A included in the pixel $P_A$. Therefore, the weight calculating unit 152 increases $W_i$ as the height $Z_i$ of a region projected in one pixel increases to complement it, based on Equation (4).

In addition, the influence of inclination is calculated from an inner product of the unit normal vector $e_z$ in the z-axis direction and a unit normal vector at a point of interest (refer to Equation (4)). In this example, the unit normal vector in the region A is $n_i$, and the unit normal vector in the region B is $n_j$. The inner product is 1.0 when the point of interest faces perpendicularly downward, and decreases as the subject inclines. When the subject is inclined, the region is imaged smaller than actual size on the camera side. That is, when the subject is inclined, a predetermined region including a point of interest has a larger area to be imaged in one pixel than that when the subject is not inclined, and is underestimated as a result of calculation in pixel unit. Therefore, the weight calculating unit 152 increases $W_i$ as the inclination of the subject increases, to complement it, based on Equation (4).

Subsequently, the weight calculating unit 152 calculates a weight according to a distance and inclination by using $W_i$ complemented to Equation (5). The barycenter calculating unit 153 calculates barycentric coordinates of the subject using a value that is obtained by multiplying coordinates of a pixel by a weight corresponding to the pixel. This is to calculate the barycentric coordinates of the subject after equalizing the data amount of the pixel $P_B$ corresponding to the distance and inclination of the region B and the data amount of the pixel $P_A$ that corresponds to the distance and inclination of the region A. Thus, the barycenter calculating unit 153 is enabled to calculate the barycentric coordinates corresponding to a subject region accurately.

It has been explained that the quadric-surface fitting unit 151 performs fitting to a quadric surface from three-dimensional shape data of a subject. However, not limited thereto, the quadric-surface fitting unit 151 may perform, at fitting, weighting according to a physical length of a subject by processing similar to the second calculation processing. At this time, the quadric-surface fitting unit 151 can ignore an item of inclination of the subject, that is, an item $n_i \cdot e_z$ of inclination in Equation (4). This is applicable when the subject is substantially planar. In this case, the quadric-surface fitting unit 151 calculates a weight of each point $x_i$ by using Equation (5), substituting the height $Z_i$ of a point on the subject into $W_i$ instead of Equation (4). The quadric-surface fitting unit 151 performs quadric surface fitting by using a weight of each point $x_i$ as in an example below. Note that it may be configured to use a coefficient $W_i' = W_{ix}$ as weighting. While Equation (4) is weight correction according to a physical length, $W_i'$ is weighting according to an area.

As one example, the quadric-surface fitting unit 151 defines an equation of a quadric surface as Equation (7).

$$\hat{z} = ax^2 + by^2 + cxy + dx + ey + f \quad (7)$$

The quadric-surface fitting unit 151 acquires a coefficient A that minimizes a squared error between the defined equation of a quadric surface and measured data z of a quadric surface obtained by fitting from three-dimensional shape data. The coefficient A to be acquired is (a, b, c, d, e, f)$^T$. That is, the quadric-surface fitting unit 151 acquires the coefficient A that is expressed by Equation (8) below. N refers to the total number of pixels, and $w_k$ refers to a weight according to height on the subject that corresponds to a k-th pixel.

$$\varepsilon^2(A) = \sum_{k=1}^{N} w_k |z_k - \hat{z}_k|^2 \quad (8)$$

A vector of the coefficient A is acquired as in Equation (9). A matrix Z is measured data $(z_1, z_2, \ldots, z_N)^T$. A matrix W is a diagonal matrix in which weights of respective points are set diagonally, and is expressed by Equation (10). A matrix X is indicated by Equation (11), and is expressed by coordinates of N pieces of pixels.

$$A = (X^T W X)^{-1} X^T W Z \qquad (9)$$

$$W = \begin{pmatrix} w1 & 0 & 0 \\ 0 & w2 & 0 \\ 0 & 0 & \ldots \end{pmatrix} \qquad (10)$$

$$X = \begin{bmatrix} x_1^2 & y_1^2 & x_1 y_1 & x_1 & y_1 & 1 \\ x_2^2 & y_2^2 & x_2 y_2 & x_2 & y_2 & 1 \\ & & & & & \\ x_N^2 & y_N^2 & x_N y_N & x_N & y_N & 1 \end{bmatrix} \qquad (11)$$

Figure 4:
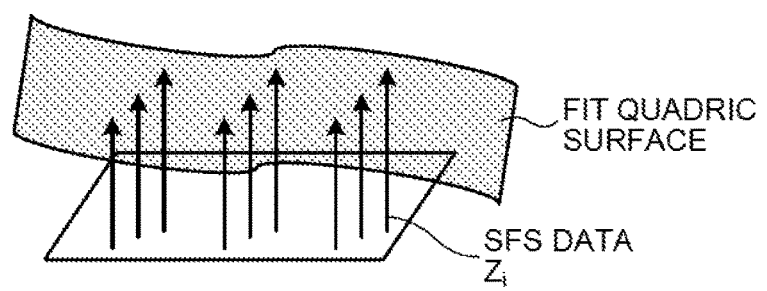
FIG. 4 explains weighted quadric-surface fitting according to the first embodiment.

The quadric-surface fitting unit 151 calculates a weighted quadric surface by substituting values of respective items of the acquired coefficient A into corresponding items in Equation (7). Weighted quadric-surface fitting according to the first embodiment is explained referring to FIG. 4. FIG. 4 explains the weighted quadric-surface fitting according to the first embodiment. As depicted in FIG. 4, the quadric-surface fitting unit 151 acquires the height $Z_i$ (i refers to a pixel) of the subject from SFS data of the subject. The quadric-surface fitting unit 151 fits the subject into a quadric surface based on the height $Z_i$ of the subject. The quadric-surface fitting unit 151 uses a weight according to the height $Z_i$ at fitting, to fit the subject into a weighted quadric surface. Thus, the quadric-surface fitting unit 151 is enabled to acquire a quadric surface corresponding to a subject region accurately.

Flowchart of Barycenter Calculation Processing

Figure 5:
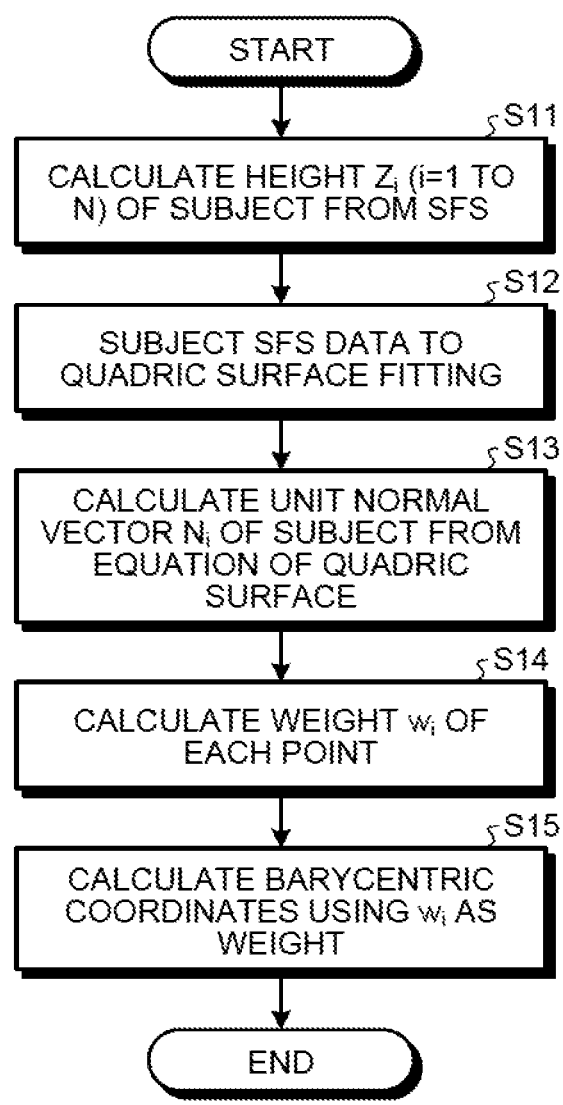
FIG. 5 is a flowchart of barycenter calculation processing according to the first embodiment.

FIG. 5 is a flowchart of barycenter calculation processing according to the first embodiment. In FIG. 5, the three-dimensional-shape acquiring unit 14 acquires SFS data as three-dimensional shape data of a subject. Moreover, the weight calculating unit 152 and the barycenter calculating unit 153 calculate barycentric coordinates by the second calculation processing. Furthermore, N refers to the total number of pixels.

As depicted in FIG. 5, the quadric-surface fitting unit 151 acquires the height (distance) $Z_i$ (i=1 to N) of the subject from the SFS data acquired by the three-dimensional-shape acquiring unit 14 (step S11). For example, the quadric-surface fitting unit 151 calculates the height $Z_i$ from the reference position to the subject corresponding to each pixel by using SFS of the subject.

The quadric-surface fitting unit 151 fits the acquired SFS data into a quadric surface (step S12).

The weight calculating unit 152 calculates a unit normal vector $N_i$ at a point on the subject corresponding to an i-th point from an equation of the quadric surface obtained by fitting (step S13). The unit normal vector $e_z$ in the z-axis direction is (0, 0, 1).

The weight calculating unit 152 calculates the weight $w_i$ of each point (step S14). For example, the weight calculating unit 152 calculates a weight according to a height and inclination of the subject corresponding to each pixel. The weight calculating unit 152 calculates a weight corresponding to each pixel by using Equation (4) and Equation (5).

Subsequently, the barycenter calculating unit 153 calculates barycentric coordinates using the weight $w_i$ (step S15). For example, the barycenter calculating unit 153 calculates barycentric coordinates of the subject by using Equation (6).

Thereafter, if the calculated barycentric coordinates significantly deviate from the center of an imaging region, it may be arranged to guide the position of the subject.

As described, according to the first embodiment, the image processing apparatus 1 divides an image of a subject into multiple pixels. The image processing apparatus 1 acquires a distance from a reference position to the subject that corresponds to each pixel. The image processing apparatus 1 sets a weight of each pixel according to the distance. The image processing apparatus 1 corrects information relating to the size of the subject projected in each pixel based on the weight. The image processing apparatus 1 calculates a posture of the subject based on the corrected information of the size of the subject. According to the configuration, the image processing apparatus 1 can grasp the posture of a subject accurately.

Moreover, according to the first embodiment, the image processing apparatus 1 calculates a barycenter of a subject based on the corrected information of the size of the subject. According to the configuration, the image processing apparatus 1 can calculate a barycenter of a subject accurately.

Furthermore, according to the first embodiment, the image processing apparatus 1 fits an image of a subject into a quadric surface based on corrected information of the size of the subject. According to the configuration, the image processing apparatus 1 can fit an image of a subject into a quadric surface accurately.

[b] Second Embodiment

The image processing apparatus 1 of the first embodiment calculates an area on a subject corresponding to one pixel on an image by using three-dimensional shape data of the subject, and calculates a weight according to the calculated area. The image processing apparatus 1 further calculates barycentric coordinates of the subject using the weight according to the area. That is, the image processing apparatus 1 has been explained as to calculate barycentric coordinates by using the first calculation method of barycentric coordinates. Moreover, the image processing apparatus 1 calculates a distance from a reference position to the subject projected in one pixel and inclination, and calculates a weight according to the calculated distance and inclination. The image processing apparatus 1 further calculates barycentric coordinates of the subject using the weight according to the distance and inclination. That is, the image processing apparatus 1 has been explained as to calculate barycentric coordinates by using the second calculation method of barycentric coordinates. In a second embodiment, a case in which the image processing apparatus 1 uses the calculation methods of barycentric coordinates in gesture authentication is explained.

Configuration of Image Processing Apparatus According to Second Embodiment

Figure 6:
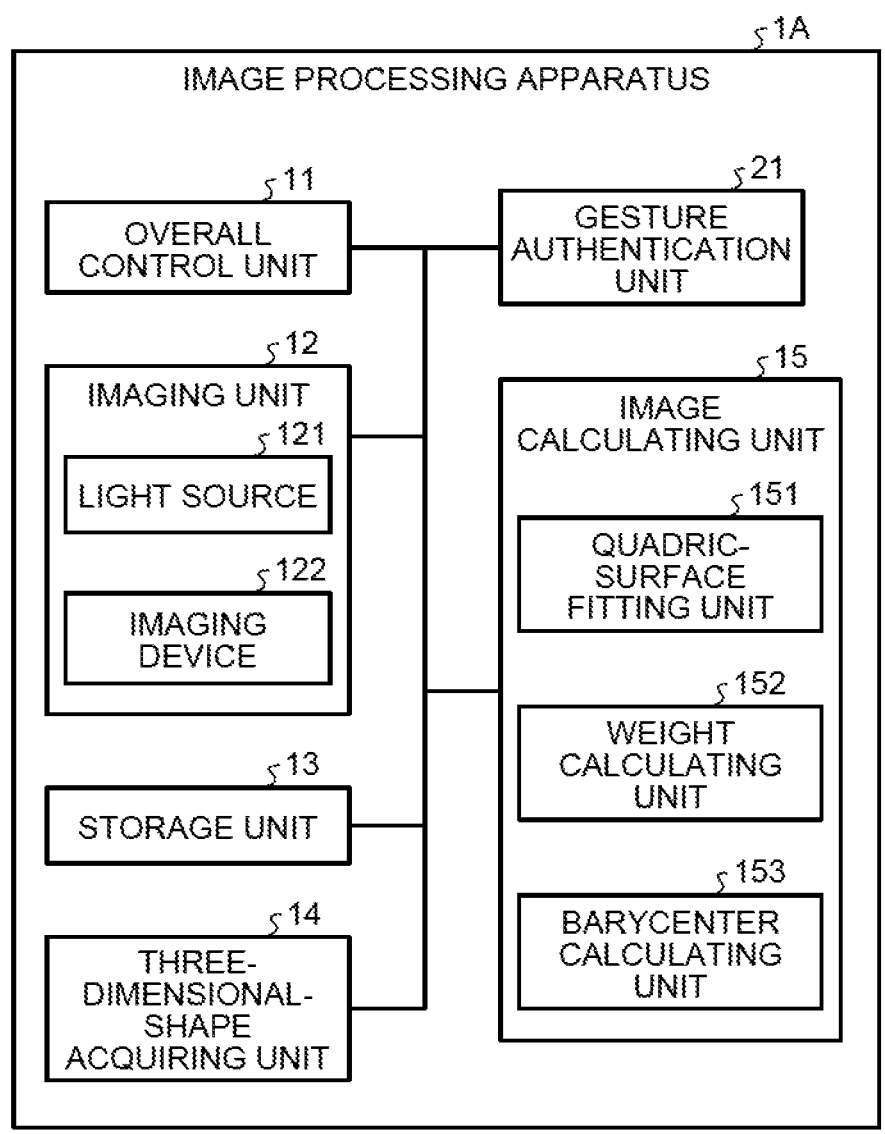
FIG. 6 is a functional block diagram depicting a configuration of an image processing apparatus according to a second embodiment.

FIG. 6 is a functional block diagram depicting a configuration of an image processing apparatus according to the second embodiment. Identical reference symbols are assigned to identical components to those of the image processing apparatus 1 depicted in FIG. 1, and duplicated explanation of configuration and operation is omitted. The second embodiment differs from the first embodiment in that a gesture authentication unit 21 is added.

The gesture authentication unit 21 performs gesture authentication using barycentric coordinates of a subject that are calculated by the image calculating unit 15.

Use of Calculation Processing of Barycentric Coordinates

Figure 7:
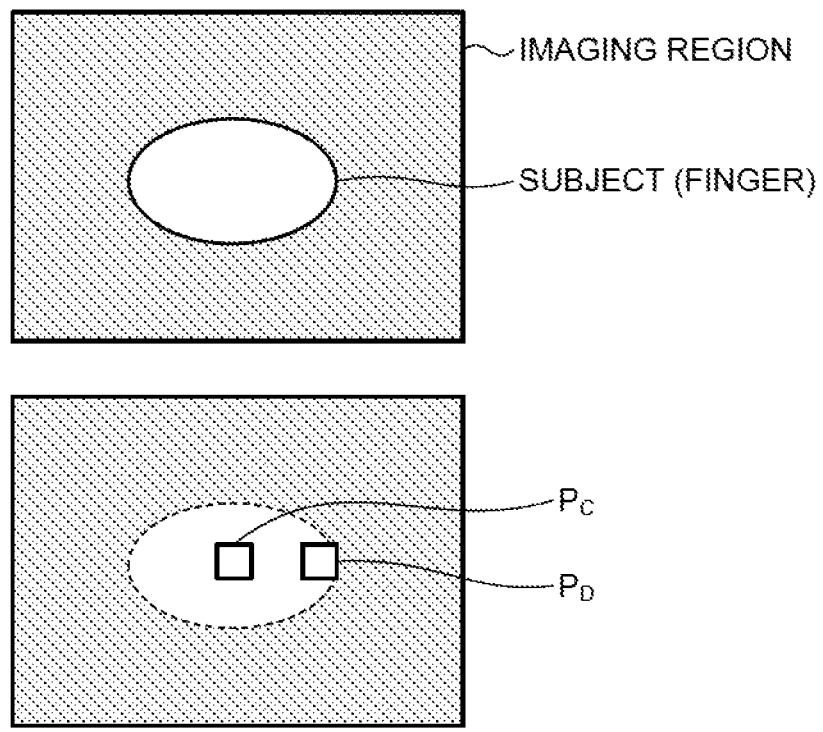
FIG. 7 explains calculation processing of barycentric coordinates used in gesture authentication.

The calculation processing of barycentric coordinates that is used in the gesture authentication is explained referring to FIG. 7. FIG. 7 explains the calculation processing of barycentric coordinates used in the gesture authentication. In FIG. 7, a case of calculating barycentric coordinates by using the first calculation method is explained.

As depicted in FIG. 7, an imaging region to be imaged by the imaging unit 12 is depicted. A central portion in the imaging region is the subject. In this example, the subject is a finger.

The image calculating unit 15 calculates barycentric coordinates of a subject as follows. In this example, explanation is given taking a pixel $P_C$ and pixel $P_D$ of the imaging device 122 as an example. In the pixel $P_C$, a central portion of a finger, that is, a region that faces straight to the camera is projected. In the pixel $P_D$, a side portion of the finger, that is, an inclined region is projected. Therefore, the region projected in the pixel $P_D$ has a larger imaged area than the region projected in the pixel $P_C$. That is, the data amount of the pixel $P_D$ is underestimated compared to the data amount of the pixel $P_C$. Therefore, the weight calculating unit 152 calculates an area on the finger that corresponds to one pixel on the image by using three-dimensional shape data of the finger, and calculates a weight according to the area by using Equation (2). Subsequently, the barycenter calculating unit 153 calculates barycentric coordinates of the subject using Equation (3) by substituting the weight according to the area and coordinates of the pixel into Equation (3).

It has been explained that the weight calculating unit 152 calculates an area on the subject that corresponds to one pixel by using three-dimensional shape data of a subject. Alternatively, the three-dimensional-shape acquiring unit 14 can measure an area on the subject that corresponds to one pixel from a three-dimensional shape. Furthermore, the three-dimensional-shape acquiring unit 14 can be a three-dimensional-shape measuring device that is integrated in or attached externally to the image processing apparatus 1. When the three-dimensional-shape acquiring unit 14 is a three-dimensional-shape measuring device, the three-dimensional-shape acquiring unit 14 is enabled to calculate an area on the subject that corresponds to one pixel speedily.

[c] Third Embodiment

The image processing apparatus 1 of the first embodiment calculates an area on a subject corresponding to one pixel on an image by using three-dimensional shape data of the subject, and calculates a weight according to the calculated area. The image processing apparatus 1 further calculates barycentric coordinates of the subject using the weight according to the area. That is, the image processing apparatus 1 has been explained as to calculate barycentric coordinates by using the first calculation method of barycentric coordinates. Moreover, the image processing apparatus 1 calculates a distance from a reference position to the subject projected in one pixel and inclination, and calculates a weight according to the calculated distance and inclination. The image processing apparatus 1 further calculates barycentric coordinates of the subject using the weight according to the distance and inclination. That is, the image processing apparatus 1 has been explained as to calculate barycentric coordinates by using the second calculation method of barycentric coordinates. In a third embodiment, a case in which the image processing apparatus 1 uses the second calculation method of barycentric coordinates in palm vein authentication is explained.

Configuration of Image Processing Apparatus According to Third Embodiment

Figure 8:
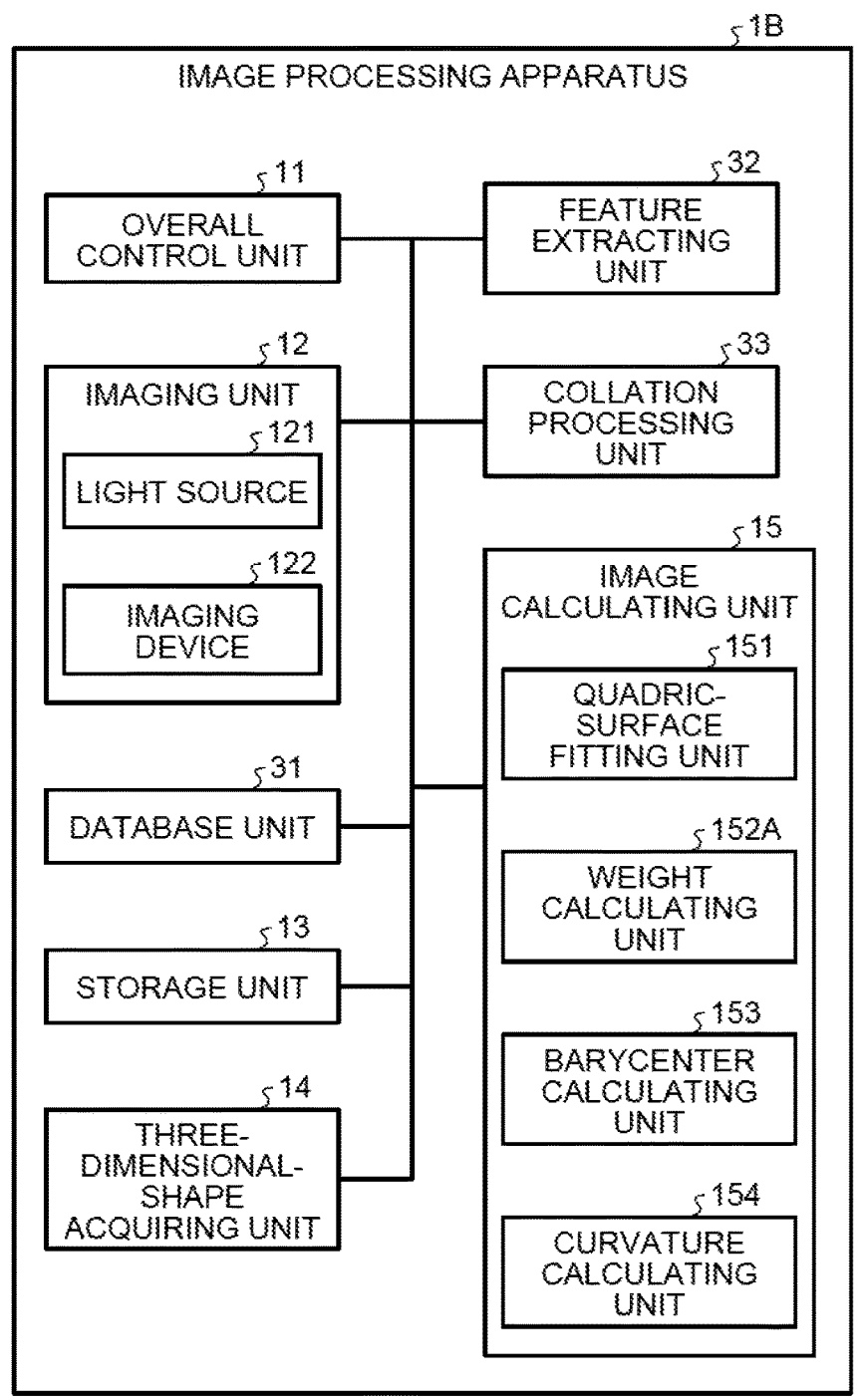
FIG. 8 is a functional block diagram depicting a configuration of an image processing apparatus according to a third embodiment.

FIG. 8 is a functional block diagram depicting a configuration of an image processing apparatus according to the third embodiment. Identical reference symbols are assigned to identical components to those of the image processing apparatus 1 depicted in FIG. 1, and duplicated explanation of configuration and operation is omitted. The third embodiment differs from the first embodiment in that a database unit 31, a feature extracting unit 32, and a collation processing unit 33 are added. Moreover, the third embodiment differs from the first embodiment in that a curvature calculating unit 154 is added to the image calculating unit 15. The third embodiment differs from the first embodiment in that the weight calculating unit 152 is replaced with a weight calculating unit 152A. Note that although the quadric-surface fitting unit 151 can perform either weighted quadric-surface fitting or non-weighted quadric-surface fitting, a case of weighted quadric-surface fitting is explained herein.

The database unit 31 stores data that is used for palm vein authentication. As one example, the database unit 31 stores registration templates. In the registration template, feature data of a palm of each user is registered.

The feature extracting unit 32 extracts feature data of a palm that is used for palm authentication from a captured image.

The collation processing unit 33 collates the feature data extracted by the feature extracting unit 32 and the feature data registered in the registration template, and outputs a similarity degree.

The weight calculating unit 152A calculates a normal vector on the subject from an equation of a quadric surface that is obtained by fitting by the quadric-surface fitting unit 151. That is, the weight calculating unit 152A calculates $n_i$ in Equation (4). $n_i$ is a unit normal vector at a point on a subject that corresponds to the i-th pixel.

As one example, an equation of a quadric surface obtained by fitting is expressed by Equation (12).

$$Z = aX^2 + bY^2 + cXY + dX + eY + f \quad (12)$$

Expressing a point P on the quadric surface with two variables, u and v, a normal vector n at the point P is acquired as in Equation (13). $P_u$ refers to partial differentiation by the variable u, and $P_v$ revers to partial differentiation by the variable v.

$$\vec{n} = \frac{\vec{P}_u \times \vec{P}_v}{|\vec{P}_u \times \vec{P}_v|} \quad (13)$$

Suppose the two variables u and v are an X coordinate and a Y coordinate on a curved surface, respectively. As (X, Y, Z) is a point of a quadric surface, and Z is expressed by Equation (12), following Equation (14) is obtained.

$$P = (X, Y, Z) = (u, v, au^2 + bv^2 + cuv + du + ev + f) \quad (14)$$

$P_u$ and $P_v$ at the point (X, Y, Z) are acquired as in Equation (15).

$$\vec{P}_u = \begin{pmatrix} 1 \\ 0 \\ 2au + cv + d \end{pmatrix} \quad \vec{P}_v = \begin{pmatrix} 1 \\ 0 \\ 2bv + cu + e \end{pmatrix} \quad (15)$$

The weight calculating unit 152A calculates the normal vector n at each point P(X, Y, Z) on the quadric surface as expressed in Equation (16) by using Equation (13) and Equation (15).

$$\vec{n} = \begin{pmatrix} \dfrac{-(2au+cv+d)}{\sqrt{(2au+cv+d)^2+(2bv+cu+e)^2+1}} \\ \dfrac{-(2bv+cu+e)}{\sqrt{(2au+cv+d)^2+(2bv+cu+e)^2+1}} \\ \dfrac{1}{\sqrt{(2au+cv+d)^2+(2bv+cu+e)^2+1}} \end{pmatrix} \quad (16)$$

For the acquired normal vector at each point P and the predetermined unit normal vector in the z-axis direction, the weight calculating unit 152A calculates a weight according to a distance and inclination by using Equation (4) and Equation (5).

Referring back to FIG. 8, the curvature calculating unit 154 calculates a curvature on the subject from the equation of the quadric surface obtained by fitting by the quadric-surface fitting unit 151.

As an example, the equation of the quadric surface is expressed by Equation (12). Suppose the two variables u and v are an X coordinate and a Y coordinate on a curved surface, respectively. As (X, Y, Z) is a point of a quadric surface, following Equation (14) is obtained. Furthermore, A distance to a point Q that is close to the point P is expressed by following Equation (17). E, F, G in Equation (17) are expressed by Equation (18) below.

$$ds^2 = E du^2 + F dudv + G dv^2 \quad (17)$$

$$E = \vec{P}_u \cdot \vec{P}_u \quad F = \vec{P}_u \cdot \vec{P}_v \quad G = \vec{P}_v \cdot \vec{P}_v \quad (18)$$

In approximation of the quadric surface, E, F, G are expressed by Equation (19) below.

$$E = 1 + (2au+cv+d)^2$$

$$F = (2au+cv+d)(2bv+cu+e)$$

$$G = 1 + (2bv+cu+e)^2 \quad (19)$$

With such a precondition, the curvature calculating unit 154 acquires a Gaussian curvature and a mean curvature on the quadric surface. First, the curvature calculating unit 154 acquires values L, M, and N expressed by Equation (20).

$$L = \vec{P}_{uu} \cdot \vec{n} \quad M = \vec{P}_{uv} \cdot \vec{n} \quad N = \vec{P}_{vv} \cdot \vec{n} \quad (20)$$

Furthermore, on the quadric surface, $P_{uu}$, $P_{uv}$, and $P_{vv}$ are acquired by Equation (21) below.

$$\vec{P}_{uu} = \begin{pmatrix} 0 \\ 0 \\ 2a \end{pmatrix} \quad \vec{P}_{uv} = \begin{pmatrix} 0 \\ 0 \\ c \end{pmatrix} \quad \vec{P}_{vv} = \begin{pmatrix} 0 \\ 0 \\ 2b \end{pmatrix} \quad (21)$$

The curvature calculating unit 154 then substitutes acquired $P_{uu}$, $P_{uv}$, and $P_{vv}$ into Equation (20), to acquire L, M, and N by Equation (22) below.

$$L = \dfrac{2a}{\sqrt{(2au+cv+d)^2+(2bv+cu+e)^2+1}} \quad (22)$$

-continued $$M = \dfrac{c}{\sqrt{(2au+cv+d)^2+(2bv+cu+e)^2+1}}$$

$$N = \dfrac{2b}{\sqrt{(2au+cv+d)^2+(2bv+cu+e)^2+1}}$$

Using L, M, and N in Equation (22), the curvature calculating unit 154 acquires a Gaussian curvature K (=k1·k2) and a mean curvature H (=(k1+k2)/2) as in Equation (23) below. Note that k1 and k2 refer to main curvatures.

$$K = k_1 k_2 = \dfrac{LN - M^2}{EG - F^2} \quad (23)$$

$$H = \dfrac{k_1 + k_2}{2} = \dfrac{EN + GL + 2FM}{2(EG - F^2)}$$

That is, the curvature calculating unit 154 acquires a Gaussian curvature $K_i$ at each point, and acquires a mean value $X_K$ of Gaussian curvatures as in Equation (24) below. Note that a weight $w_i$ may be a weight that is acquired by the weight calculating unit 152A.

$$X_K = \sum_{i=1}^{N} w_i K_i \quad (24)$$

In addition, the curvature calculating unit 154 performs guidance processing when the mean value $X_K$ of Gaussian curvatures is larger than a predetermined threshold. This is performed based on the estimation that the palm is curled. The predetermined threshold may be a value enabling to estimate that a palm is curled. In such a case, the curvature calculating unit 154 guides to open the palm. For example, the curvature calculating unit 154 outputs a message, "Please hold your hand open". When the mean value $X_K$ of Gaussian curvatures is smaller than the predetermined threshold, the curvature calculating unit 154 proceeds to authentication processing. This is because it is estimated that the hand is open.

Flowchart of Palm Vein Authentication Processing

Figure 9:
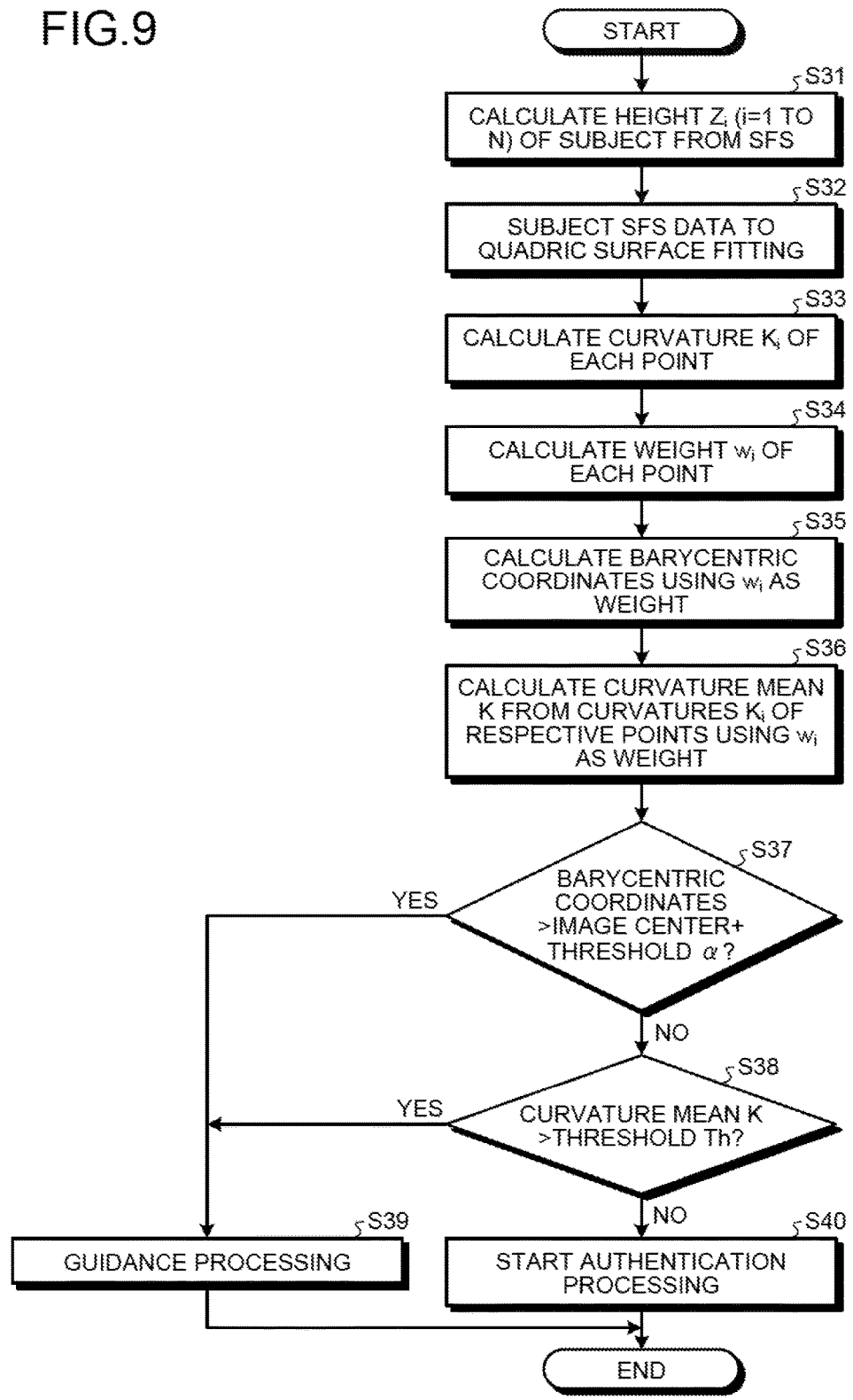
FIG. 9 is a flowchart of palm-vein authentication processing according to a third embodiment.

FIG. 9 is a flowchart of the palm-vein authentication processing according to the third embodiment. In FIG. 9, the three-dimensional-shape acquiring unit 14 acquires SFS data as three-dimensional shape data of a subject. N refers to the total number of pixels.

As depicted in FIG. 9, the quadric-surface fitting unit 151 acquires a height (distance) $Z_i$ (i=1 to N) of the subject from acquired SFS data (step S31). For example, the quadric-surface fitting unit 151 calculates the height $Z_i$ from a reference position to the subject corresponding to each pixel by using the SFS of the subject.

The quadric-surface fitting unit 151 fits the acquired SFS data into a quadric surface (step S32). For example, the quadric-surface fitting unit 151 performs weighted quadric-surface fitting using a height of the subject as a weight.

Subsequently, the curvature calculating unit 154 calculates the curvature $K_i$ at each point on the subject that corresponds to an i-th point of pixel from an equation of the quadric surface obtained by fitting by the quadric-surface fitting unit 151 (step S33).

The weight calculating unit 152A calculates the weight $w_i$ at each point (step S34). For example, the weight calculating unit 152A calculates a normal vector of each point on the quadric surface from the quadric surface obtained by fitting by the quadric-surface fitting unit 151. For the calculated normal vector at each point and a predetermined unit normal vector in the z-axis direction, the weight calculating unit 152A calculates a weight by using Equation (4) and Equation (5).

The barycenter calculating unit 153 calculates barycentric coordinates using the weight $w_i$ at each point (step S35). For example, the barycenter calculating unit 153 calculates barycentric coordinates of the subject by using Equation (6).

Subsequently, the curvature calculating unit 154 calculates a curvature mean K from the curvatures $K_i$ of the respective points using $w_i$ as a weight (step S36). For example, the curvature calculating unit 154 calculates the curvature mean K by using Equation (24) for wi and the curvature $K_i$.

Subsequently, the barycenter calculating unit 153 determines whether the calculated barycentric coordinates are out of a range of a threshold $\alpha$ from the center of the captured image (step S37). When determining that the barycentric coordinates are out of the range of the threshold $\alpha$ from the center of the captured image (step S37: YES), the barycenter calculating unit 153 proceeds to step S39 to perform the guidance processing. This is because it has been determined to be deviated significantly from the center of the imaging region. The threshold $\alpha$ may be a value enabling to estimate that coordinates are approximated to predetermined coordinates.

On the other hand, when determining that the barycentric coordinates are within the range of the threshold $\alpha$ from the center of the captured image (step S37: NO), the curvature calculating unit 154 determines whether the curvature mean K is larger than a threshold Th (step S38). When determining that the curvature mean K is larger than the threshold Th (step S38: YES), the curvature calculating unit 154 proceeds to step S39 to perform the guidance processing. This is because it has been determined that the palm is curled.

At step S39, the barycenter calculating unit 153 or the curvature calculating unit 154 performs the guidance processing (step S39). Thereafter, the palm-vein authentication processing is once ended.

On the other hand, when determining that the curvature mean K is not larger than the threshold Th (step S38: NO), the curvature calculating unit 154 causes the feature extracting unit 32 and the collation processing unit 33 to start the authentication processing (step S40). When the authentication processing is finished, the palm-vein authentication processing is ended.

As described, according to the third embodiment, an image processing apparatus 1B calculates a distance from a reference position to a palm that corresponds to each pixel and inclination thereof. The image processing apparatus 1B sets a weight of each pixel according to the distance and inclination. Moreover, the image processing apparatus 1B calculates curvatures of the palm corresponding to respective pixels based on three-dimensional shape of the palm. The image processing apparatus 1B calculates a mean value of curvatures using a weight. The image processing apparatus 1B calculates barycentric coordinates using the weight. According to the configuration, using the calculated barycentric coordinates, the image processing apparatus 1B can guide a palm to a position suitable for authentication, and can perform palm vein authentication accurately. Using the calculated mean value of curvatures, the image processing apparatus 1B can guide the palm to a posture suitable for authentication, and can perform palm vein authentication accurately. Particularly, in the case of palm vein authentication, as a distance between the imaging unit 12 and a palm is, for example, about 5 centimeters to be short, influence of inclination of the palm is large. That is, depending on the inclination of a palm, the amounts of information of the palm to be imaged into pixels become uneven. Therefore, the image processing apparatus 1B is enabled to perform palm vein authentication accurately by correcting the unevenness.

Although the image processing apparatus 1B has been explained to be used for palm vein authentication as one example, not limited thereto, the image processing apparatus 1B can be used for other kinds of biometric authentication such as iris authentication, besides palm vein authentication.

Others

The respective illustrated components of the image processing apparatus 1 needs not necessarily be physically configured as illustrated. That is, a specific mode of distribution and integration of the image processing apparatus 1 is not limited to the one illustrated, and all or a part thereof can be configured to be functionally or physically distributed or integrated in an arbitrary unit. For example, the weight calculating unit 152 and the barycenter calculating unit 153 may be integrated into one unit. Moreover, the quadric-surface fitting unit 151 may be divided into a functional unit of fitting a subject into a quadric surface and a functional unit of calculating a height from the quadric surface obtained by fitting. Furthermore, the storage unit 13 may be configured to be connected to the image processing apparatus 1 through a network as an external device.

Figure 10:
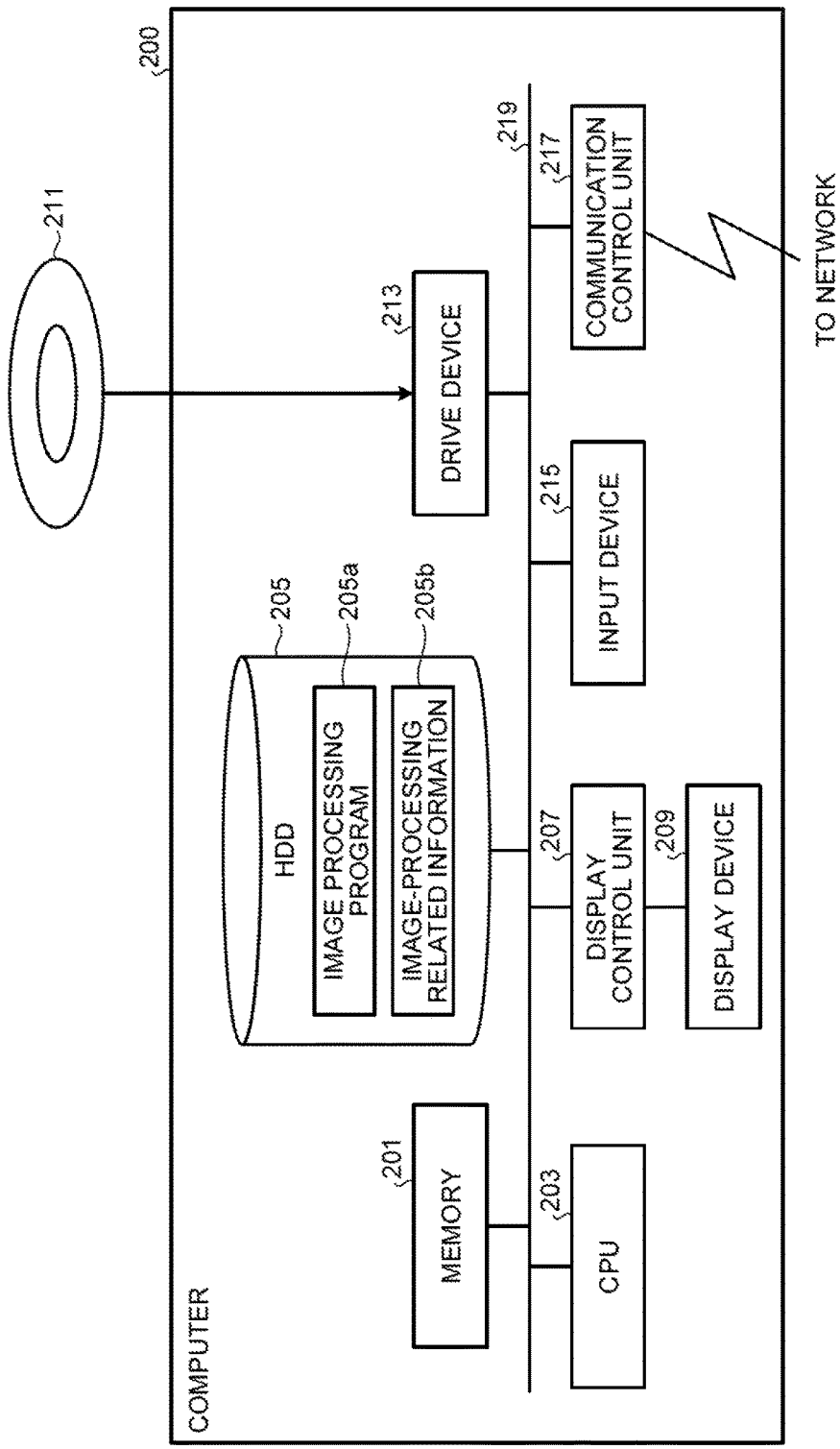
FIG. 10 depicts one example of a computer that executes an image processing program.
Figure 11:
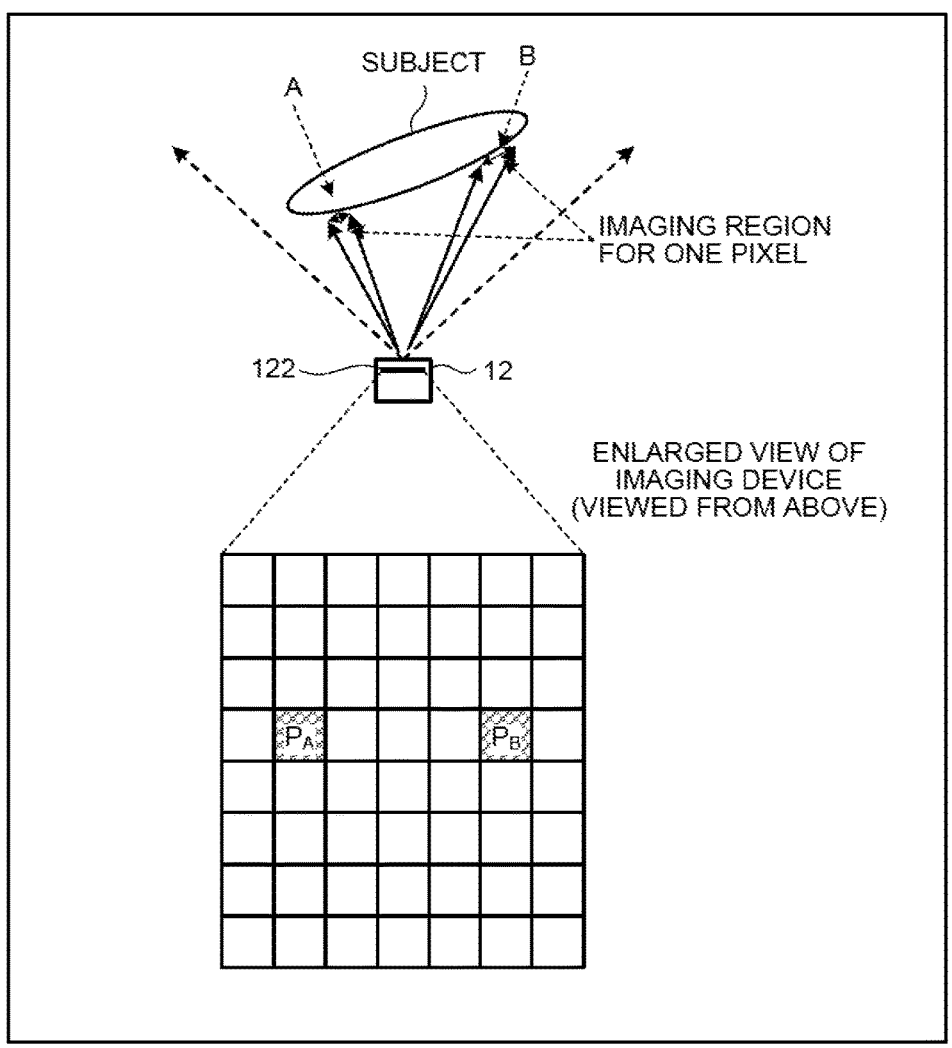
FIG. 11 explains influence caused when a subject is inclined.

Moreover, the respective processing explained in the above embodiments can be implemented by executing a program prepared in advance by a computer such as a personal computer and a work station. Therefore, in the following, one example of a computer that executes an image processing program that implements similar functions to those of the image processing apparatus 1 depicted in FIG. 1 is explained. FIG. 10 depicts one example of the computer that executes the image processing program.

As depicted in FIG. 10, a computer 200 includes a central processing unit (CPU) 203 that performs various kinds of calculation processing, an input device 215 that accepts an input of data from a user, and a display control unit 207 that controls a display device 209. Furthermore, the computer 200 includes a derive device 213 that reads a program and the like from a recording medium, and a communication control unit 217 that communicates data with other computers through a network. Moreover, the computer 200 includes a memory 201 that temporarily stores various kinds of information, and a hard disk drive (HDD) 205. The memory 201, the CPU 203, the HDD 205, the display control unit 207, the drive device 213, the input device 215, and the communication control unit 217 are connected to each other through a bus 219.

The drive device 213 is a device used for, for example, a removable disk 211. The HDD 205 stores an image processing program 205a and image-processing related information 205b.

The CPU 203 reads the image processing program 205a, develops on the memory 201, and executes as processes. The processes correspond to the respective functional units of the image processing apparatus 1. The image-processing related information 205b corresponds to the storage unit 13. Furthermore, for example, the removable disk 211 stores various kinds of information such as the image processing program 205a.

The image processing program 205a needs not necessarily be stored in the HDD 205 from the beginning. For example, the program can be stored in a "portable physical medium" such as a flexible disk (FD), a compact-disk read-only memory (CD-ROM), a digital versatile disk (DVD), a magneto-optical disk, and an integrated circuit (IC) card, and the computer 200 can read the image processing program 205a from such a medium to execute the program.

According to one embodiment, statistical calculation for a subject region can be accurately performed in image processing.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An image processing apparatus comprising:
a processor that executes a process including:
dividing an image of a subject into a plurality of blocks;
acquiring, for each block, a distance to an area on the subject corresponding to the block from a reference position based on a three-dimensional shape data of the subject;
calculating, for each block, a weight according to the distance;
correcting, for each block, size information of a subject area that is projected in the block based on the weight; and
calculating a statistical amount of the subject based on the each size information corrected for each block.

2. The image processing apparatus according to claim 1, wherein the block is a pixel.

3. The image processing apparatus according to claim 1, wherein
the calculating a statistical amount includes calculating a barycenter as the statistical amount.

4. The image processing apparatus according to claim 1, wherein
the calculating a statistical amount includes fitting the image of the subject into a quadric surface.

5. The image processing apparatus according to claim 4, wherein
the calculating a statistical amount includes calculating a curvature mean on the quadric surface that is obtained by fitting, as the statistical amount.

6. The image processing apparatus according to claim 1, wherein
the subject is a palm of a human.

7. A non-transitory computer-readable recording medium having stored therein a program that causes a computer to execute a process comprising:
dividing an image of a subject into a plurality of blocks;
acquiring, for each block, a distance to an area on the subject corresponding to the block from a reference position based on a three-dimensional shape data of the subject;
calculating, for each block, a weight according to the distance;
correcting, for each block, size information of a subject area that is projected in the block based on the weight; and
calculating a statistical amount of the subject based on the each size information corrected for each block.

8. An image processing method to be performed by a computer, the method comprising:
dividing an image of a subject into a plurality of blocks using a processor;
acquiring, for each block, a distance to an area on the subject corresponding to the block from a reference position based on a three-dimensional shape data of the subject using the processor;
calculating, for each block, a weight according to the distance using the processor;
correcting, for each block, size information of a subject area that is projected in the block based on the weight using the processor; and
calculating a statistical amount of the subject based on the each size information corrected for each block using the processor.

* * * * *